United States Patent
Weinrib et al.

(10) Patent No.: US 11,050,857 B2
(45) Date of Patent: Jun. 29, 2021

(54) TRANSMISSION CONTROL PROTOCOL (TCP) ACKNOWLEDGEMENT (ACK) PACKET SUPPRESSION

(71) Applicant: Texas Instruments Incorporated, Dallas, TX (US)

(72) Inventors: Uri Weinrib, Lod (IL); Oren Shani, Israel (IL); Ben Gilboa, Tel Aviv (IL)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 920 days.

(21) Appl. No.: 14/333,751

(22) Filed: Jul. 17, 2014

(65) Prior Publication Data
US 2016/0021220 A1 Jan. 21, 2016

(51) Int. Cl.
*G06F 13/00* (2006.01)
*H04L 29/06* (2006.01)
(Continued)

(52) U.S. Cl.
CPC ........... *H04L 69/162* (2013.01); *H04L 69/22* (2013.01); *H04L 69/326* (2013.01); *H04L 5/0055* (2013.01)

(58) Field of Classification Search
CPC ... H04L 29/06; H04L 47/10; H04L 29/06095; H04L 29/06115; H04L 29/08072;
(Continued)

(56) References Cited

U.S. PATENT DOCUMENTS 8,325,753 B1 * 12/2012 Bharghavan .......... H04L 1/1854
370/431
2005/0190693 A1 9/2005 Jinzaki et al.
(Continued)

FOREIGN PATENT DOCUMENTS

CN 1578309 A 2/2005
CN 1842052 A 10/2006
(Continued)

OTHER PUBLICATIONS

Eugene Yakubovich, "Folding SSL/TLS Into TCp to Gain Efficiency", Developer's Perspective, Jun. 4, 2013, XP055450669, Retrieved from the Internet: URL:http://dev-perspective.blogspot.nl/2013/06/folding-ssitis-into-tcp-to-gain.html (retrieved on Feb. 13, 2018], *p. 1-p. 2*.
(Continued)

*Primary Examiner* — Robert B Harrell
(74) *Attorney, Agent, or Firm* — Ebby Abraham; Charles A. Brill; Frank D. Cimino

(57) ABSTRACT

Systems and methods for Transmission Control Protocol (TCP) acknowledgement (ACK) packet suppression are described. In various implementations, these systems and methods may be applicable to low-power communications. For example, a method may include receive an incoming TCP packet at a TCP layer implemented by the communication system; de-encapsulating the incoming TCP packet using a TCP protocol to identify an incoming Secure Sockets Layer (SSL) or Transport Layer Security (TLS) packet; passing the incoming SSL or TLS packet from the TCP layer to an SSL or TLS layer; and signaling, by the SSL or TLS layer to the TCP layer in response to the SSL or TLS layer having received the incoming SSL or TLS packet, that a TCP acknowledgement be suppressed by the TCP layer.

18 Claims, 4 Drawing Sheets

(51) Int. Cl.
*H04L 29/08* (2006.01)
*H04L 5/00* (2006.01)

(58) Field of Classification Search
CPC ..... H04L 63/0428; H04L 12/58; H04L 63/04;
H04L 63/08; H04L 1/1854; H04L 5/55;
H04L 12/28; H04L 12/403; H04L
12/2801; H04L 29/06027; H04L 69/22;
H04L 69/162; H04L 69/326; H04L 5/00;
H04L 5/0055; H04L 12/751; H04L 29/08;
H04L 29/0653; H04L 45/0426; H04L
63/166; H04L 63/0272; H04L 2012/5652;
H04L 67/00; G06F 13/00; H04Q 11/0478;
H04Q 11/047; H04W 28/06; H04W 88/08
USPC .......................................... 370/431; 709/237
See application file for complete search history.

(56) References Cited

U.S. PATENT DOCUMENTS

2010/0037311 A1 2/2010 He et al.
2014/0337614 A1* 11/2014 Kelson ................. H04L 63/168
713/152

FOREIGN PATENT DOCUMENTS

EP   1569408 A3   2/2006
WO   2001008372   2/2001
WO   2007147037   12/2007

OTHER PUBLICATIONS

A. Langley, Google, Inc. A: "Faster Application Handshakes with SYN/ACK Payloads; draft-agl-tcpm-sadata-01.txt", Faster Application Handshakes with SYN/ACK Payloads; Draft-AGL-TCPM-Sadala-01, TXT, Internet Engineering Task Force, IETF; Standardworkingdraft, Internet Society (ISOC) 4, Rue Des Falaises Ch-1205 Geneva, Switzerland, No. 1, Aug. 5, 2008, XP015057251, *the whole document*.

Y. Cheng, Google, et al., "TCP Fast Open; draft-ietf-tcpm-fastopen-09.txt", TCP Fast Open; Draft-IETF-TCPM-Fastopen-09.TXT, Internet Engineering Task Force, IETF; Standardworkingdraft, Internet Society (ISOC) 4, Rue Des Falaises Ch-1205 Geneva, Switzerland, Aug. 30, 2014, pp. 1-26, XP015099943, [retrieved on Jul. 1, 2014], *the whole document*.

Notification of Issuance of Office Action for PRC (China)Patent Application No. 20158003797.7; email date Sep. 26, 2019.

Office Action for PRC (China)Patent Application No. 20158003797.7.

* cited by examiner

| SOURCE | PROTOCOL |
|---|---|
| 84:DD:20:E0:65:34 | 802.11 Null Data |
| 00:1D:7E:60:F5:3F | 802.11 Ack |
| 301 → 10.0.0.9 | HTTPS |
| 00:1D:7E:60:F5:3F | 802.11 Ack |
| 00:1D:7E:60:F5:3F | 802.11 Beacon |
| 84:DD:20:E0:65:34 | 802.11 Null Data |
| 00:1D:7E:60:F5:3F | 802.11 Ack |
| 84:DD:20:E0:65:34 | 802.11 Null Data |
| 84:DD:20:E0:65:34 | 802.11 Null Data |
| 84:DD:20:E0:65:34 | 802.11 Null Data |
| 84:DD:20:E0:65:34 | 802.11 Null Data |
| 84:DD:20:E0:65:34 | 802.11 Null Data |
| 00:1D:7E:60:F5:3F | 802.11 Ack |
| 00:1D:7E:60:F5:3F | 802.11 Beacon |
| 84:DD:20:E0:65:34 | 802.11 PS-Poll |
| 00:1D:7E:60:F5:3F | 802.11 Ack |
| 302 → 173.194.66.147 | HTTPS |
| 84:DD:20:E0:65:34 | 802.11 Ack |
| 84:DD:20:E0:65:34 | 802.11 PS-Poll |
| 00:1D:7E:60:F5:3F | 802.11 Ack |
| 303 → 173.194.66.147 | HTTPS |
| 84:DD:20:E0:65:34 | 802.11 Ack |
| 84:DD:20:E0:65:34 | 802.11 Null Data |
| 00:1D:7E:60:F5:3F | 802.11 Ack |
| 304 → 173.194.66.147 | HTTPS |
| 84:DD:20:E0:65:34 | 802.11 Ack |
| 305 → 173.194.66.147 | HTTPS |
| 84:DD:20:E0:65:34 | 802.11 Ack |
| 84:DD:20:E0:65:34 | 802.11 PS-Poll |
| 00:1D:7E:60:F5:3F | 802.11 Ack |

| | | |
|---|---|---|
| 10.0.0.9 | HTTPS | ← 306 |
| 00:1D:7E:60:F5:3F | 802.11 Ack | |
| 84:DD:20:E0:65:34 | 802.11 Null Data | |
| 00:1D:7E:60:F5:3F | 802.11 Ack | |
| 00:1D:7E:60:F5:3F | 802.11 Beacon | |
| 10.0.0.9 | HTTPS | ← 307 |
| 00:1D:7E:60:F5:3F | 802.11 Ack | |
| 00:1D:7E:60:F5:3F | 802.11 Beacon | |
| 84:DD:20:E0:65:34 | 802.11 Null Data | |
| 00:1D:7E:60:F5:3F | 802.11 Ack | |
| 84:DD:20:E0:65:34 | 802.11 Null Data | |
| 84:DD:20:E0:65:34 | 802.11 Null Data | |
| 00:1D:7E:60:F5:3F | 802.11 Ack | |
| 00:1D:7E:60:F5:3F | 802.11 Beacon | |
| 00:1D:7E:60:F5:3F | 802.11 Beacon | |
| 00:1D:7E:60:F5:3F | 802.11 Beacon | |
| 00:1D:7E:60:F5:3F | 802.11 Beacon | |
| 00:1D:7E:60:F5:3F | 802.11 Beacon | |
| 00:1D:7E:60:F5:3F | 802.11 Beacon | |
| 00:1D:7E:60:F5:3F | 802.11 Beacon | |
| 00:1D:7E:60:F5:3F | 802.11 Beacon | |
| 00:1D:7E:60:F5:3F | 802.11 Beacon | |
| 00:1D:7E:60:F5:3F | 802.11 Beacon | |
| 00:1D:7E:60:F5:3F | 802.11 Beacon | |
| 00:1D:7E:60:F5:3F | 802.11 Beacon | |
| 00:1D:7E:60:F5:3F | 802.11 Beacon | |
| 00:1D:7E:60:F5:3F | 802.11 Beacon | |

FIG. 3A

| SOURCE | PROTOCOL |
|---|---|
| 00:1D:7E:60:F5:3F | 802.11 Beacon |
| 00:1D:7E:60:F5:3F | 802.11 Beacon |
| 00:1D:7E:60:F5:3F | 802.11 Beacon |
| 00:1D:7E:60:F5:3F | 802.11 Beacon |
| 00:1D:7E:60:F5:3F | 802.11 Beacon |
| 10.0.0.9 | HTTPS |
| 00:1D:7E:60:F5:3F | 802.11 Ack |
| 10.0.0.9 | HTTPS |
| 00:1D:7E:60:F5:3F | 802.11 Ack |
| 10.0.0.9 | HTTPS |
| 00:1D:7E:60:F5:3F | 802.11 Ack |
| 84:DD:20:E0:65:34 | 802.11 Null Data |
| 00:1D:7E:60:F5:3F | 802.11 Ack |
| 00:1D:7E:60:F5:3F | 802.11 Beacon |
| 58:35:D9:E6:9C:05 | 802.1 |
| 84:DD:20:E0:65:34 | 802.11 Null Data |
| 00:1D:7E:60:F5:3F | 802.11 Ack |
| 00:1D:7E:60:F5:3F | 802.11 Beacon |
| 84:DD:20:E0:65:34 | 802.11 PS-Poll |
| 00:1D:7E:60:F5:3F | 802.11 Ack |
| 173.194.66.147 | HTTPS |
| 84:DD:20:E0:65:34 | 802.11 Ack |

| SOURCE | PROTOCOL |
|---|---|
| 84:DD:20:E0:65:34 | 802.11 PS-Poll |
| 00:1D:7E:60:F5:3F | 802.11 Ack |
| 173.194.66.147 | HTTPS |
| 84:DD:20:E0:65:34 | 802.11 Ack |
| 84:DD:20:E0:65:34 | 802.11 PS-Poll |
| 00:1D:7E:60:F5:3F | 802.11 Ack |
| 00:1D:7E:60:F5:3F | 802.11 Null Data |
| 84:DD:20:E0:65:34 | 802.11 Ack |
| 84:DD:20:E0:65:34 | 802.11 Null Data |
| 00:1D:7E:60:F5:3F | 802.11 Ack |
| 10.0.0.9 | HTTPS |
| 00:1D:7E:60:F5:3F | 802.11 Ack |
| 84:DD:20:E0:65:34 | 802.11 Null Data |
| 00:1D:7E:60:F5:3F | 802.11 Ack |
| 00:1D:7E:60:F5:3F | 802.11 Beacon |
| 10.0.0.9 | HTTPS |
| 00:1D:7E:60:F5:3F | 802.11 Ack |
| 00:1D:7E:60:F5:3F | 802.11 Beacon |
| 84:DD:20:E0:65:34 | 802.11 Null Data |
| 00:1D:7E:60:F5:3F | 802.11 Ack |
| 84:DD:20:E0:65:34 | 802.11 Null Data |
| 00:1D:7E:60:F5:3F | 802.11 Ack |
| 00:1D:7E:60:F5:3F | 802.11 Beacon |

FIG. 3B

TRANSMISSION CONTROL PROTOCOL (TCP) ACKNOWLEDGEMENT (ACK) PACKET SUPPRESSION

TECHNICAL FIELD

This specification is directed, in general, to network communications, and, more specifically, to systems and methods for Transmission Control Protocol (TCP) acknowledgement (ACK) packet suppression.

BACKGROUND

The Internet protocol suite specifies how data should be transmitted by a source and received at a destination over a computer network. The suite is generally organized into four or more abstraction layers, which are then used to sort related networking protocols. One such protocol is referred to as the TCP protocol, which is a type of transport protocol responsible for end-to-end message transfer independent of the underlying network. For example, web browsers are known to use TCP when connecting to servers on the World Wide Web. Also, TCP is commonly used to deliver email and to transfer files from one location to another.

The TCP protocol is designed to guarantee that all bytes received are identical to the bytes originally transmitted, and in the correct order. Because packet transfer over many networks is unreliable, however, TCP requires the destination to respond with an acknowledgment message as it receives the data. The source may keep a record of each packet it sends and may retransmit a given packet if a timer expires before the packet has been acknowledged.

In some cases, a destination receiving a stream of TCP packets may increase communication efficiency by sending fewer than one ACK per packet received, which is referred to as "delayed ACK." According to the Internet Engineering Task Force's (IETF) Request for Comments (RFC) 1122, however, such a delay must be smaller than 0.5 seconds and there should be an ACK for at least every second packet. Moreover, as the inventor hereof have recognized, although a conventional delayed ACK implementations can potentially reduce the total number of packets communicated between devices, excessive delays on ACKs can still disturb round-trip timing as well as other aspects of the communication.

SUMMARY

Systems and methods for Transmission Control Protocol (TCP) acknowledgement (ACK) packet suppression are described. In an illustrative, non-limiting embodiment, a method may include receiving an incoming transport packet at a transport layer implemented via a computer system; de-encapsulating the incoming transport packet using a transport protocol to identify an incoming security packet and passing the incoming security packet to a security layer; and signaling, by the security layer to the transport layer in response to the security layer having received the incoming security packet, that an acknowledgement packet be suppressed by the transport layer.

In some implementations, the incoming transport packet may be a TCP packet, the transport layer may be a TCP layer, the transport protocol may be a TCP protocol, and the acknowledgement packet may be a TCP acknowledgement packet. The incoming security packet may be a Transport Layer Security (TLS) packet or a Secure Sockets Layer (SSL) packet. Moreover, the incoming security packet may be part of a security handshake between the computer system and another computer system, and the handshake may take place over a network. Additionally or alternatively, the security handshake may include an SSL handshake, and the incoming security package may include a client hello message, a server hello message, a server hello done message, a client finished message, a server finished message, or a change cipher spec notification.

The method may further include suppressing transmission of the acknowledgement packet by the transport layer in response to the signaling. The method may further include receiving, at the transport layer, an outgoing security packet in response to the incoming security packet; and encapsulating, by the transport layer, the outgoing security packet using the transport protocol into an outgoing transport packet.

The outgoing transport packet may include an acknowledgement indication. The acknowledgement indication may be in a header portion of the outgoing transport packet. The acknowledgement indication may be in an acknowledgement field of the header portion.

In another illustrative, non-limiting embodiment, a communication system may include a processor and a memory coupled to the processor, the memory configured to store program instructions executable by the processor to cause the communication system to receive an incoming TCP packet at a TCP layer implemented by the communication system; de-encapsulate the incoming TCP packet using a TCP protocol to identify an incoming SSL packet; pass the incoming SSL packet from the TCP layer to an SSL layer; and signal, by the SSL layer to the TCP layer in response to the SSL layer having received the incoming SSL packet, that a TCP acknowledgement be suppressed by the TCP layer.

In yet another illustrative, non-limiting embodiment, a non-transitory electronic storage medium may have program instructions stored thereon that, upon execution by a processor within a communication system, cause the communication system to: receive an incoming TCP packet at a TCP layer implemented by the communication system; de-encapsulate the incoming TCP packet using a TCP protocol to identify an incoming TLS packet; pass the incoming TLS packet from the TCP layer to a TLS layer; and signal, by the TLS layer to the TCP layer in response to the TLS layer having received the incoming TLS packet, that a TCP acknowledgement be suppressed by the TCP layer.

In some embodiments, one or more communications devices or computer systems may perform one or more of the techniques described herein. In other embodiments, a tangible computer-readable or electronic storage medium may have program instructions stored thereon that, upon execution by one or more communications devices or computer systems, cause the one or more communications devices or computer systems to execute one or more operations disclosed herein. In yet other embodiments, a communications system or device may include at least one processor and a memory coupled to the at least one processor. Examples of a processor include, but are not limited to, a digital signal processor (DSP), an application specific integrated circuit (ASIC), a system-on-chip (SoC) circuit, a field-programmable gate array (FPGA), a microprocessor, or a microcontroller. The memory may be configured to store program instructions executable by the at least one processor to cause the system to execute one or more operations disclosed herein.

BRIEF DESCRIPTION OF THE DRAWINGS

Figure 1:
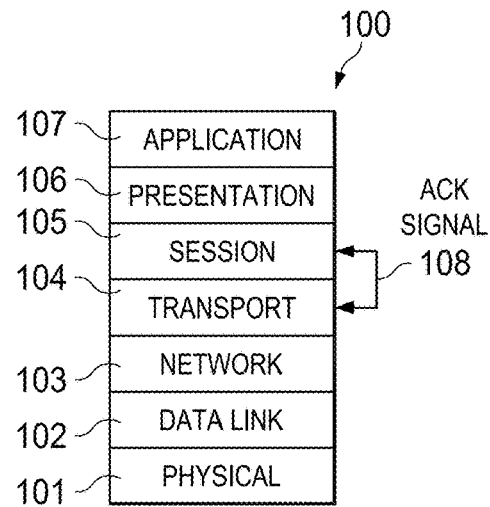

Having thus described the invention(s) in general terms, reference will now be made to the accompanying drawings, wherein:

FIG. 1 is a block diagram of a modified Open Systems Interconnection model (OSI) 100 implemented according to some embodiments.

Figure 2:
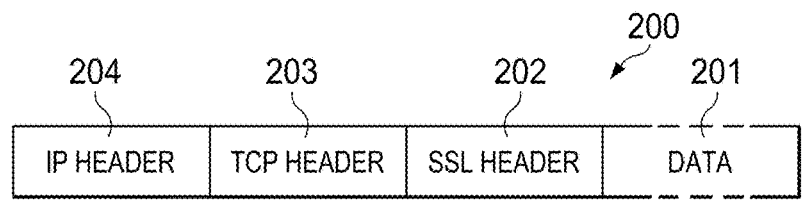

FIG. 2 is a block diagram of encapsulated data according to some embodiments.

FIGS. 3A-B illustrate an example of a sequence of packets intercepted in a client-server communication to show one or more TCP ACK packets that may be suppressed according to some embodiments.

Figure 4:
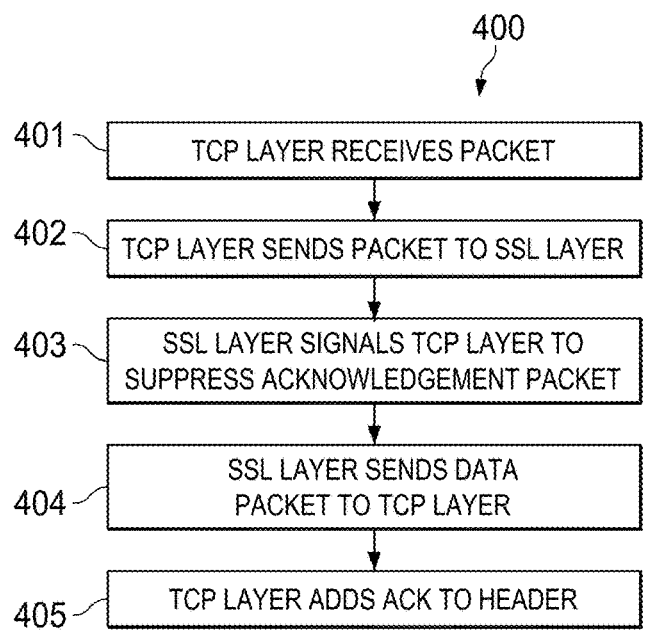

FIG. 4 is a flowchart of a method for TCP ACK packet suppression according to some embodiments.

Figure 5:
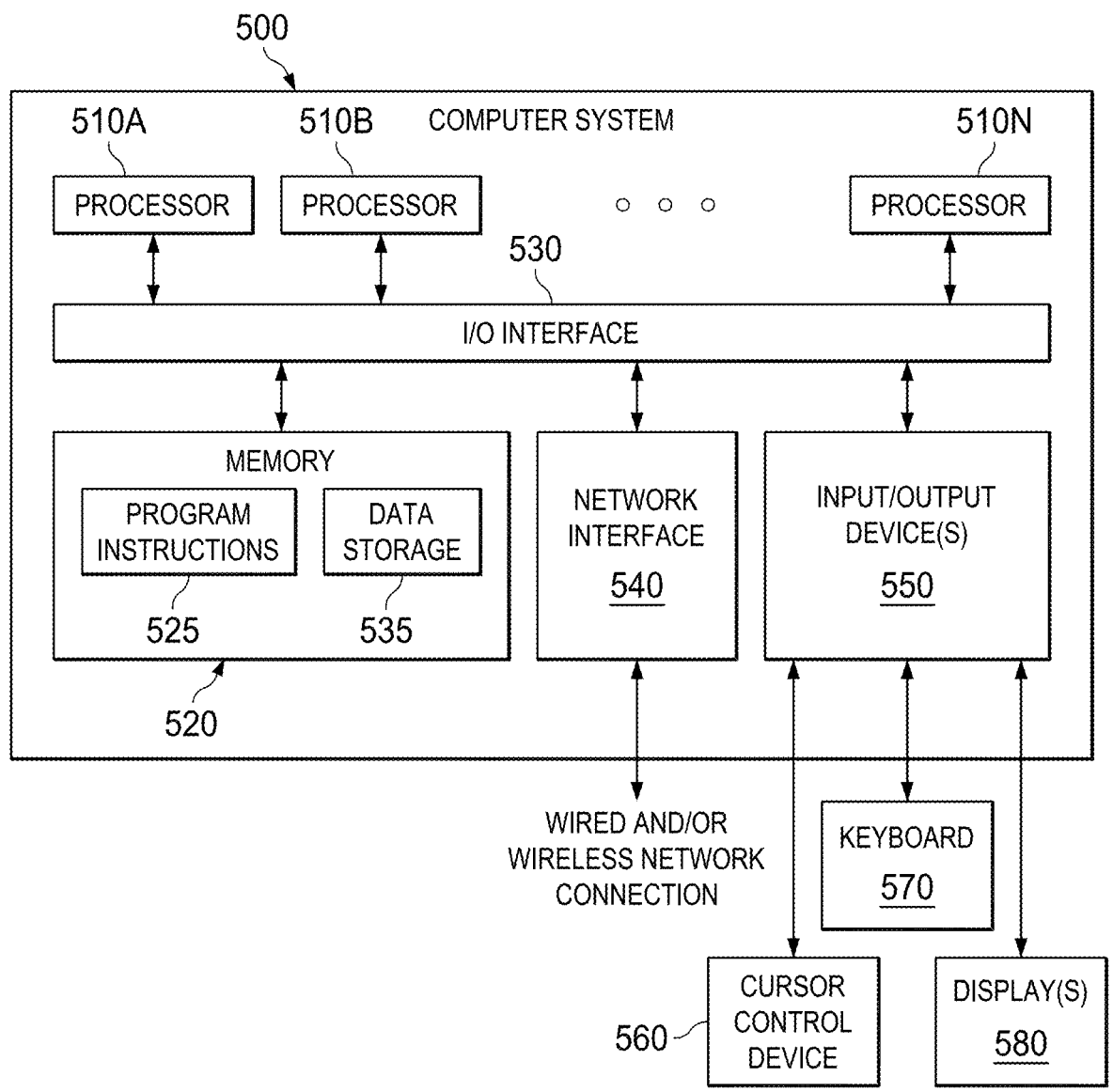

FIG. 5 is a block diagram of a computer system configured to implement systems and methods for TCP ACK suppression according to some embodiments.

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

In various embodiments, the systems and methods described herein may be used to suppress or otherwise dilute transport protocol acknowledgement (ACK) packets or messages in a network communication between a source and a destination (e.g. between two computer systems, a computer system and a communication device, two communication devices, etc.). An example of a transport protocol used in Internet communications is the Transmission Control Protocol (TCP). In some cases, ACK packets may be suppressed when the communication also employs a session or security protocol such as, for instance, the Secure Sockets Layer (SSL) or the Transport Layer Security (TLS) protocol.

To better illustrate the foregoing, FIG. 1 is a block diagram of a modified Open Systems Interconnection model (OSI) 100, according to some embodiments. In various applications, suite 100 may be implemented by an operating system, software, and/or firmware executed by a host computing system or communication device (hereinafter "host"). Generally speaking, OSI model 100 is a conceptual model that characterizes internal operations of a communication system by partitioning it into logical layers 101-107. A given layer serves the layer immediately above it, and is served by the immediately layer below it.

Particularly, model 100 has three media layers including physical layer 101, data link layer 102, and network layer 103. Physical layer 101 operates at the bit level and provides direct point-to-point (although not necessarily reliable) data connection. Data link layer 102 operates at the bit and/or frame level, and it provides a reliable direct point-to-point data connection. Network layer 103 operates and the packet and/or datagram level, and it provides addressing, routing, and delivery of datagrams between points in a network.

Model 100 has four additional host layers, including transport layer 104, session layer 105, presentation layer 106, and application layer 107. Transport layer 104 operates at the segment level and it provides reliable delivery of packets between points of a network. Layers 105-107 operate at the data level. Session layer 105 provides inter-host communication and managing of sessions between applications, presentation layer 106 provides data representation, encryption and decryption, and conversion of machine dependent data to machine independent data, and application layer 107 provides network processes to one or more applications.

In modified model 100, session layer 105 may be configured to communicate with transport layer 104 using acknowledgement signal 108. For example, session layer 105 may signal transport layer 104, in response to session layer 105 having received an incoming packet or message, that a dedicated acknowledgement response packet or message be suppressed by transport layer 104. These, and other embodiments, are discussed in more detail below.

In some applications, modified model 100 may be used as a modified Internet protocol suite, also known as TCP/IP, In those applications, network layer 103 may be an Internet layer, which uses the IP protocol. End-to-end message transmission or connecting applications at transport layer 104 may be categorized as either (a) connection-oriented, implemented in TCP, or (b) connectionless, implemented in User Datagram Protocol (UDP), Also, session layer 105 may implement the SSL or TLS protocol. Therefore, in these applications, SSL or TLS layer 105 may signal the TCP layer that a TCP acknowledgement be suppressed by the TCP layer according to some embodiments, In some embodiments, ACK signal 108 may be implemented as a message or command sent from session layer 105 to transport layer 104. In other embodiments, ACK 108 may be implemented as a data structure (e.g., a flag) external to model 100 but accessible to both session layer 105 and transport layer 104, such that session layer 105 may indicate an opportunity for transport layer 104 to suppress an ACK message by manipulating that data structure (e.g., turning the flag on or off).

Still referring to FIG. 1, at each level (N), two hosts exchange protocol data units (PDUs) by means of a layer-N protocol. A service data unit (SDU) is the payload of a PDU, transmitted unchanged to a peer Data that has been passed down from an OSI layer to the next-lower layer, and which the lower layer encapsulates into a protocol data unit (PDU). Layer N−1 adds a header or footer, or both, to the SDU, composing a PDU of layer N−1. The added framing makes it possible to get the data from a source to a destination. As such, the PDU at a layer N becomes the SDU of layer N−1.

To illustrate this process, FIG. 2 is a block diagram of encapsulated data 200 according to some embodiments. In a transmitting or source host, data 201 is received by session layer 105, which adds to it SSL header 202. The SSL packet or message made up of a combination of data 201 and SSL header 202 is then passed to transport layer 104, which adds TCP header 203 to the SSL packet. Then, the TCP packet including data 201, SSL header 202, and TCP header 203 is processed by network layer 103, which adds to it IP header 204. The encapsulation process continues as the information is sent to lower layers until the information is ultimately transmitted to the destination host.

In the reverse direction, when the information is received by a destination host, a de-encapsulation process is used to remove headers 202-204 as the information moves up to higher layers. Specifically, network or IP layer 103 removes IP header 204 to result in a transport packet made up of data 201, SSL header 202, and TCP header 203. Transport layer 104 removes TCP header 203 to result in an SSL packet made of data 201 and SSL header 202. Then, service layer 103 removes SSL header 202 from the SSL packet before sending data 201 to presentation layer 106 and/or application layer 107.

In some embodiments, as part of the de-encapsulation process of an incoming packet or message sent by a transmitting host, transport layer 104 may identify the security packet and pass the incoming security packet to security layer 105. Upon receiving the incoming security packet, security layer 105 may provide ACK signal 108 to transport layer 104 to allow transport layer 104 to suppress the sending of a dedicated ACK packet back to the transmitting host. Once a response to the incoming packet has been provided to transport layer 104 for sending to the transmitting host, transport layer 104 may include an acknowledgement indication in TCP header 203, for example. In other words, rather than sending a TCP ACK packet immediately upon receipt of the incoming packet, a destination host may suppress such a TCP ACK packet until a substantive response to the incoming packet, and the substantive response packet may include an ACK indication in a TCP header of that response.

As a person of ordinary skill in the art will recognize in light of this disclosure, the encapsulation and de-encapsulation processes illustrated with reference to FIG. 2 are provided in a simplified manner for ease of understanding. In actual implementations, each layer may further process and/or manipulate the received data in various additional ways that are generally well understood.

FIGS. 3A-B illustrate an example of a sequence of packets 300 intercepted in a client-server communication to show one or more TCP ACK packets that may be suppressed according to some embodiments. More specifically, each of packets 300 has been captured from a Wi-Fi interface using a sniffer device. Packet 301 is a "client hello" packet that uses the Hypertext Transfer Protocol Secure (HTTPS) protocol, which is the result of layering the Hypertext Transfer Protocol (HTTP) on top of the SSL/TLS protocol, and which is transmitted by a client host identified by IP address 10.0.0.9. As part of the same interaction, packet 302 is a TCP ACK packet transmitted from a server host or destination having IP address 173.194.66.147 back to the client host.

Generally speaking, packet 301 initiates an SSL handshake procedure between the client host and the server host. As a result, the server host sends packet 303, which is a "Server Hello" packet, back to the client host. Server hosts also sends "Certificate" packet 304 and "Server Hello Done" packet 305, back to the client host. In this example, the client hosts sends TCP ACK packets 306 and 307 to the server host in response to packets 303, 304, and/or 305.

The client host then sends "Client Key Exchange" packet 308, "Change Cipher Spec" packet 309, and "Client Finished" packet 310 to the server host. The server host sends TCP ACK packet 311 and "Change Cipher Spec" packet 312 to client host. Then, the client host sends TCP ACK packets 313 and 314 back to the server host.

In some embodiments, one or more of ACK packets 302, 306, 307, 311, 313, and 314 may be suppressed, at least in part, using the systems and methods described herein. During the security handshake process, each host may implement a protocol stack in the manner shown in FIG. 1, for example, such that each host's transport layer 104 withholds the sending of a dedicated TCP ACK packet at the command of its session layer 105, until a subsequent packet is ready for transmission. Then, transport layer 104 may introduce an ACK indication in that subsequent packet therefore reducing the number of packets that would otherwise be transmitted back and forth during the handshake.

FIG. 4 is a flowchart of method 400 for TCP ACK packet suppression. In some embodiments, method 400 may be performed, at least in part, by a client and/or server host configured to implement modified OSI model 100 of FIG. 1. At block 401, a transport layer (e.g., a TCP layer) receives an incoming packet (e.g., a TCP packet). At block 402, the TCP layer sends the TCP packet to a service or security layer (e.g., an SSL or TLS layer). At block 403, the SSL layer signals the TCP layer to suppress a dedicated acknowledgement packet transmission (e.g., a TCK ACK packet).

At block 404, the SSL layer sends an outgoing data packet (e.g., an SSL packet) to the TCP layer in response to the incoming TCP packet. At block 405, the TCP layer adds an acknowledgement indication to a header encapsulating the SSL packet to create an outgoing TCP packet. In some cases, the acknowledgement indication may be placed in an acknowledgement field of the header portion of the outgoing TCP packet.

Because in SSL negotiations the next packet is guaranteed, dilution or suppression of TCP ACK packets does not cause any degradation in the quality of the communication, especially during the handshake process, but also in other contexts. Furthermore, by omitting certain TCP ACK packets from the communication, the client and/or sever hosts may be capable or preserving energy and therefore may facilitate operation in lower power mode.

In certain embodiments, one or more of the techniques described above may be executed, at least in part, by one or more host computing system or communication device. One such a system is illustrated in FIG. 5. In various embodiments, system 500 may be implemented as a communication device, modem, server, a mainframe computer system, a workstation, a network computer, a desktop computer, a laptop, mobile device, or the like. In different embodiments, these various systems may be configured to communicate with each other in any suitable way, such as, for example, via a local area network or the like.

As illustrated, system 500 includes one or more processor(s) 510A-N coupled to a system memory 520 via an input/output (I/O) interface 530. Computer system 500 further includes a network interface 540 coupled to I/O interface 530, and one or more input/output devices 550, such as cursor control device 560, keyboard 570, display(s) 580, and/or mobile device 590. In various embodiments, computer system 500 may be a single-processor system including one processor, or a multi-processor system including two or more processor(s) 510A-N (e.g., two, four, eight, or another suitable number), Processor(s) 510A-N may be any processor capable of executing program instructions. For example, in various embodiments, processor(s) 510A-N may he general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processor(s) 510A-N may commonly, but not necessarily, implement the same ISA. Also, in some embodiments, at least one of processor(s) 510A-N may be a graphics processing unit (GPU) or other dedicated graphics-rendering device.

System memory 520 may be configured to store program instructions and/or data accessible by processor(s) 510A-N. In various embodiments, system memory 520 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described in the figures above, may be stored within system memory 520 as program instructions 525 and data storage 535, respectively. In other embodiments, program instructions and/or data may be received, sent or stored upon different types of computer-accessible media or on similar media separate from system memory 520 or computer system 500. Generally speaking, a computer-accessible medium may include any tangible storage media or memory media such as magnetic or optical media—e.g., disk or CD/DVD-ROM coupled to computer system 500 via I/O interface 530. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 540.

In an embodiment, I/O interface 530 may be configured to coordinate I/O traffic between processor(s) 510A-N, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor(s) 510A-N). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. In addition, in some embodiments some or all of the functionality of I/O interface 530, such as an interface to system memory 520, may be incorporated directly into processor(s) 510A-N.

Network interface 540 may be configured to allow data to be exchanged between computer system 500 and other devices attached to a network, such as other computer systems, or between nodes of computer system 500. In various embodiments, network interface 540 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 550 may, in some embodiments, include one or more display terminals, keyboards, keypads, touchpads, scanning devices, voice or optical recognition devices, mobile devices, or any other devices suitable for entering or retrieving data by one or more computer system 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

As shown in FIG. 5, memory 520 may include program instructions 525 configured to implement certain embodiments described herein (e.g., implementing one or more operations shown in FIGS. 7C, 8, and/or 9A), and data storage 535 comprising various data accessible by program instructions 525. In an embodiment, program instructions 525 may include software elements of embodiments illustrated in the above figures. For example, program instructions 525 may be implemented in various embodiments using any desired programming language, scripting language, or combination of programming languages and/or scripting languages (e.g., C, C++, C#, JAVA®, JAVASCRIPT®, PERL®, etc.). Data storage 535 may include data that may be used in these embodiments (e.g., recorded communications, profiles for different modes of operations, etc.). In other embodiments, other or different software elements and data may be included.

A person of ordinary skill in the art will appreciate that computer system 500 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

It will be understood that various operations discussed herein may be executed simultaneously and/or sequentially. It will be further understood that each operation may be performed in any order and may be performed once or repetitiously. In various embodiments, the operations discussed herein may represent sets of software routines, logic functions, and/or data structures that are configured to perform specified operations. Although certain operations may be shown as distinct logical blocks, in some embodiments at least some of these operations may be combined into fewer blocks. Conversely, any given one of the blocks shown herein may be implemented such that its operations may be divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc. Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A method, comprising:
receiving a transport packet at a transport layer;
de-encapsulating, by the transport layer, the transport packet using a transport protocol to identify a security packet;
communicating, by the transport layer, the security packet to a security layer;
in response to receiving the security packet, communicating an acknowledgement signal to the transport layer from the security layer;
in response to receiving the acknowledgement signal, suppressing an acknowledgement packet at the transport layer in order to preserve energy in a lower power mode;
adding an acknowledgment indication to a next data packet to be sent after the suppress action; and
sending the next data packet.

2. The method of claim 1, further comprising:
receiving, at the transport layer, the next data packet in response to the security packet, wherein the next data packet is an outgoing security packet; and
encapsulating, by the transport layer, the outgoing security packet using the transport protocol into an outgoing transport packet.

3. The method of claim 2, wherein the adding adds the acknowledgement indication to a header of the outgoing transport packet.

4. The method of claim 3, wherein the acknowledgement indication is in a header portion of the outgoing transport packet.

5. The method of claim 3, wherein the acknowledgement indication is in an acknowledgement field of a header portion.

6. The method of claim 1, wherein the security packet is a part of a security handshake between a first computer system and a second computer system, and. wherein the handshake takes place over a network.

7. The method of claim 6, wherein the security handshake includes a Secure Sockets Layer (SSL) handshake, and wherein the security packet includes a client hello message, a server hello message, a server hello done message, a client finished message, a server finished message, or a change cipher spec notification.

8. The method of claim 1, wherein the transport packet is a Transmission Control Protocol (TCP) packet, Wherein the transport layer is a TCP layer, Wherein the transport protocol is a TCP protocol, and wherein the acknowledgement packet is a TCP acknowledgement packet.

9. The method of claim 1, wherein the security packet is a Transport Layer Security (LS) packet or a Secure Sockets Layer (SSL) packet.

10. A non-transitory electronic storage medium having program instructions stored thereon that, upon execution by a hardware processor within a communication system, cause the communication system to:
receive a transport packet at a transport layer;
de-encapsulate the transport packet to identify a security packet;
communicate, by the transport layer, the security packet to a security layer;
in response to receiving the security packet, communicate an acknowledgement signal to the transport layer from the security layer;
in response to receiving the acknowledgement signal, suppress an acknowledgement packet at the transport layer in order to preserve energy in a lower power mode;
add an acknowledgment indication. to a next data packet to be sent after the suppress action; and
send the next data packet.

11. The non-transitory electronic storage medium of claim 10, wherein the transport packet is a TCP packet, the security layer is a TLS layer, the security packet is a TLS packet, and the TLS packet is a part of an TLS handshake between the communication system and a second communication system, and the handshake takes place over a network.

12. The non-transitory electronic storage medium of claim 11, wherein the program instructions are executable by the hardware processor to further cause the communication system to:
receive, at a TCP layer, the next data packet in response to the TLS packet, wherein the next data packet is an outgoing TLS packet; and
encapsulate, by the TCP layer, the outgoing TLS packet using a TCP protocol into an outgoing TCP packet.

13. The non-transitory electronic storage medium of claim 12, wherein the add action adds the acknowledgement indication to a header portion of the outgoing TCP packet.

14. A communication system having a hardware processor and a memory coupled to the hardware processor, the memory configured to store program instructions executable by the hardware processor to cause the communication system to:
receive a transport packet at a transport layer;
de-encapsulate, at the transport layer, the transport packet to identify a security packet,
communicate, by the transport layer, the security packet to a security layer;
in response to receiving the security packet, communicate an acknowledgement signal to the transport layer from the security layer;
in response to receiving the acknowledgement signal, suppress an acknowledgement at the transport layer in order to preserve energy in a lower power mode;
add an acknowledgment indication. to a next data packet to be sent after the suppress action; and
send the next data packet.

15. The communication system of claim 14, wherein the security packet is an SSL packet, the SSL packet is a part of an SSL handshake between the communication. system and a second communication system, and the handshake takes place over a network.

16. The communication system of claim 15, wherein the de-encapsulate action de-encapsulates the transport packet using a transport protocol, wherein the transport packet is a TCP packet and the transport protocol is a TCP protocol, and wherein the transport layer is a TCP layer.

17. The communication system of claim 16, wherein the program instructions are executable by the hardware processor to further cause the communication system to:
receive, at the TCP layer, the next data packet in response to the SSL packet, wherein the next data packet is an outgoing SSL packet; and
encapsulate, by the TCP layer, the outgoing SSL packet, using the TCP protocol into an. outgoing TCP packet, wherein the add action adds the acknowledgement indication to a header portion of the outgoing TCP packet.

18. The communication system of claim 15, wherein the SSL packet includes a client hello message, a server hello message, a server hello done message, a client finished message, a server finished message, or a change cipher spec notification.

* * * * *